United States Patent [19]

Axthammer

[11] 4,419,804
[45] Dec. 13, 1983

[54] METHOD FOR MANUFACTURING A PISTON ROD UNIT

[75] Inventor: Ludwig Axthammer, Hambach, Fed. Rep. of Germany

[73] Assignee: Fichtel & Sachs AG, Hambach, Fed. Rep. of Germany

[21] Appl. No.: 268,331

[22] Filed: May 29, 1981

[30] Foreign Application Priority Data

May 31, 1980 [DE] Fed. Rep. of Germany ....... 3020749

[51] Int. Cl.³ .................... B23P 15/00; B23P 11/00
[52] U.S. Cl. .................... 29/434; 29/156.5 A; 29/517; 29/525; 74/579 R; 403/274; 188/322.22; 92/168
[58] Field of Search .......... 29/517, 510, 525, 156.5 A, 29/520, 434; 74/579 R; 403/284, 274, 282; 72/318, 402; 188/322.22, 322.11; 92/168, 8

[56] References Cited

U.S. PATENT DOCUMENTS

| | | | |
|---|---|---|---|
| 1,169,642 | 1/1916 | Heeter et al. | 29/517 |
| 1,467,166 | 9/1923 | Jones | 72/402 |
| 1,815,626 | 7/1931 | Lee et al. | 72/402 |
| 1,911,775 | 5/1933 | Smith et al. | 29/517 |
| 2,030,169 | 2/1936 | Huck | 29/517 |
| 2,082,379 | 6/1937 | Brittain, Jr. | 29/525 |
| 2,370,603 | 2/1945 | Zimmerman | 29/517 |
| 3,078,754 | 2/1963 | DeLacy | 29/525 |
| 3,189,672 | 6/1965 | Lyman, Jr. | 29/517 |
| 3,414,965 | 12/1968 | Stau et al. | 29/517 |
| 3,480,306 | 11/1969 | Hsu | 403/282 |
| 3,641,865 | 2/1972 | Swindt et al. | 29/517 |
| 3,749,529 | 7/1973 | Cornelsen | 92/168 |
| 3,842,644 | 10/1974 | Biesmans | 72/318 |
| 4,300,274 | 11/1981 | Papst | 29/156.5 A |

FOREIGN PATENT DOCUMENTS

2248374 4/1972 Fed. Rep. of Germany .

*Primary Examiner*—Daniel C. Crane
*Attorney, Agent, or Firm*—Toren, McGeady and Stanger

[57] ABSTRACT

In illustrative embodiments a method has been shown for manufacturing a piston rod unit. The piston rod unit includes a metallic tube shaped piston rod member defining a cavity therein and at least one terminal member having a fastening pin fastened within a respective end portion of the cavity. The fastening pin is provided with an outer diameter which is larger than the initial inner diameter of the piston rod member. This fastening pin is pressed into an end portion of the cavity so as to radially expand the piston rod member along at least a part of the end portion to an expanded outer diameter larger than the initial outer diameter of the tubular piston rod member. Hereupon the piston rod member is radially compressed by hammering within the area of the expanded outer diameter until the initial outer diameter is substantially reestablished.

29 Claims, 12 Drawing Figures

METHOD FOR MANUFACTURING A PISTON ROD UNIT

BACKGROUND

1. Field of the Invention

This invention relates to piston rods, particularly for hydraulic, hydro-pneumatic and pneumatic cylinder piston units, for example, oscillation dampers. A new method for manufacturing such a piston rod is proposed which is both very economic and warrants a very strong connection between the piston rod member itself and terminal parts to be fixed to the piston rod member.

2. The Prior Art

According to the most common methods known in the art the terminal members of piston rod units are fastened to tubular piston rod members by welding or soldering. These known techniques have the disadvantage that both the tubular piston rod member and the terminal members must consist of specific materials which allow excellent welding and soldering connections. Moreover by the high temperatures occurring during welding and soldering the members to be connected are frequently subject to thermal deformation.

From German Offenlegungsschrift 22 48 374 a piston rod unit is known in which a fastening pin of a terminal member is inserted into an end portion of the cavity defined within a tubular piston rod member. The fastening pin is provided with an annular groove on its outer circumferential face. The material of the piston rod member is deformed along the peripheral groove of the fastening pin so as to completely fill this peripheral groove. As a consequence of the deformation of the material of the tubular piston rod member a peripheral groove appears on the outer circumferential face of the tubular piston rod member such that the piston rod member does not provide a smooth cylindrical surface over its total length. In other words: The effective length of the piston rod member is reduced.

SUMMARY

This invention relates to a method for manufacturing a piston rod unit which piston rod unit includes a metallic tube shaped piston rod member having an initial inner and an initial outer diameter and defining a cavity therein, and further includes at least one terminal member having a fastening pin, fastened within a respective end portion of said cavity, said method comprising (1) introducing said fastening pin into said end portion of said cavity and (2) fastening said pin to said piston rod member by radially compressing said piston rod member along at least a part of said end portion.

It is an object of the invention to improve this method such that an improved mechanical connection is obtained between the tubular piston rod member and the terminal member.

It is a further object to fasten said terminal member to said tubular piston rod member in a most economic way.

A further object of this invention is to obtain a piston rod unit, in which a smooth cylindrical outer circumferential face of the piston rod member is maintained also along the end portion within which the fastening pin is provided.

These and other objects are attained in accordance with this invention by (a) providing a terminal member with a fastening pin whose outer diameter over at least part of its length is larger than said initial inner diameter of said piston rod member; (b) axially pressing said fastening pin into said end portion of said cavity so as to radially expand said piston rod member along at least a part of said end portion to an expanded outer diameter larger than said initial outer diameter and (c) radially compressing the piston rod member within the area of expanded outer diameter until said initial outer diameter is substantially reestablished.

Preferably said radial compressing is performed by cold kneading of the material of said piston rod member, particularly by cold hammering.

In view of obtaining a connection of a maximum strength the fastening pin may be provided with at least one recess defining at least one shoulder face for engagement with the material of the piston rod member at the inner circumferential face thereof. In view of resisting to high axial forces the shoulder face should be substantially axially directed along the axes of said piston rod member and said fastening pin. The recess may be formed as an annular recess. The advantage of an annular recess is that it provides substantially axially directed shoulder faces having opposite axial direction so that both high compressive forces and high tensile forces can be transmitted by the connection between the piston rod member and the fastening pin.

According to another embodiment a recess is provided having a bottom face substantially flat and parallel to the axis of said fastening pin. This form of recess also defines two axially oppositely directed shoulder faces and moreover warrants a high torsional stability of the connection between the piston rod member and the fastening pin.

In view of obtaining a maximum torsional stability it is proposed that a shoulder face is provided which is directed substantially in circumferential direction with respect to the axis of the fastening pin. A plurality of such circumferentially directed shoulder faces may be obtained by knurling the circumferential face of said fastening pin along at least part of its length.

When preparing the fastening pin one can start from a cylindrical pin having an outer diameter substantially corresponding to the said initial inner diameter of said tubular piston rod member. In this case one can provide that part of the length of said fastening pin, which has a larger outer diameter by axial compression of said fastening pin. It has been found that the larger outer diameter of the fastening pin should exceed said initial inner diameter of said piston rod member by at least 0.5 mm preferably at least 1.0 mm, in view of obtaining a connection of high strength between said piston rod member and said fastening pin on the one hand and facilitating the radial compression work on the other hand.

In view of facilitating the insertion of the fastening pin into said cavity of said hollow piston rod member, the fastening pin may be provided with an inner end portion having an outer diameter substantially equal to said initial inner diameter of said tubular piston rod member, said end portion being adjacent a conical expanding face. By said inner end portion the fastening pin can easily be centered before the fastening pin is pressed into said cavity by axial compression force.

The insertion of the fastening pin may be further facilitated by providing a conically tapered edge at the axial inner end of the fastening pin.

The terminal member may be shaped as a connection member for connecting said piston rod member to a piston member. Alternatively said terminal member may be shaped as a connection member for connecting said piston rod unit to a construction element.

The piston rod units of this invention are particularly useful in connection with hydraulic pneumatic and hydro-pneumatic cylinder piston devices, for example, shock absorbers, spring struts and gas springs. In this field of use there is to be provided generally a first connection member at one end of the piston rod member for connecting the piston rod member to a piston member and a second terminal member at the other end of the piston rod member for connecting the piston rod member to a structural part of for example a motor car body.

When the piston rod unit is to be used in connection with high pressure cylinder piston units, it may be desirable to provide specific sealing means between the fastening pin and said tubular piston rod member.

It is a particular advantage of the method of this invention, that the requirements as to the precision of manufacturing of the fastening pin and of the tubular piston rod member are not very high. For example the tubular piston rod member may be provided as a section of a drawn tube as obtained from the drawing installation. On the other hand the terminal member including the fastening pin may be provided as a profiled turned piece as obtained from an automatic turning machine.

The piston rod unit may be subjected to machining subsequent to said radial compressing. Said machining may be restricted to the outer cylindrical surface of the tubular piston rod member. In cases in which precise centering of the terminal member with respect to the tubular piston rod member is required also the terminal member may be subjected to machining operation. The outer circumferential face may be for example subjected to a centerless grinding operation. Subsequently the piston rod member may be chrome plated.

The piston rod units as manufactured by the method of this invention have the considerable advantage that the effective length of the piston rod member extends along the total length thereof. As a result thereof the constructional length of a cylinder piston unit incorporating such a piston rod may be reduced.

As compared with piston rod units in which the terminal members are fastened by welding or soldering and pressure equalizing apertures are necessary for equalizing the pressure within the cavity, it is not necessary to provide such apertures in the piston rod unit manufactured by the method of this invention.

As a result from the method of this invention in which high temperatures are avoided during the fastening step no limitation exists with respect to the materials to be used for both the tubular piston rod member and the terminal members. So it is possible to use stainless steel as a matter of example.

BRIEF DESCRIPTION OF THE DRAWINGS

For a better understanding of the invention reference may be made of the following detailed description of exemplary embodiments, in which:

In FIG. 1 there is shown a one tube shock absorber. This shock absorber comprises a cylinder 1, a piston 2 and a piston rod 3. The piston rod 3 is provided at both ends with terminal connection members 4 and 5, the terminal connection member 4 being used for connecting the piston rod 3 to the piston member 2 and the terminal connection member 5 being used for connecting the piston rod member 3 to an outer constructional element of the body structure of a motor vehicle.

In FIG. 2a there is again shown the piston rod 3 and the terminal connection member 4. The right hand part of FIG. 2a shows the tubular piston rod 3 in its initial form as it comes from the drawing installation with a constant initial inner diameter $d_i$ and a constant initial outer diameter $d_o$. In the left hand part of FIG. 2a there is shown the fastening pin 4a of the terminal connection member 4 after insertion into the cavity of the tubular piston member 3 forming the expanded end portion 3a. One sees that the outer diameter of the fastening pin 4a is larger than the initial inner diameter of the tubular piston rod member 3 so that on insertion of the fastening pin 4a into the tubular piston rod 3, the piston rod 3 is expanded to an outside diameter $d_{ex}$ over the expanded end portion 3a.

Figure 1:
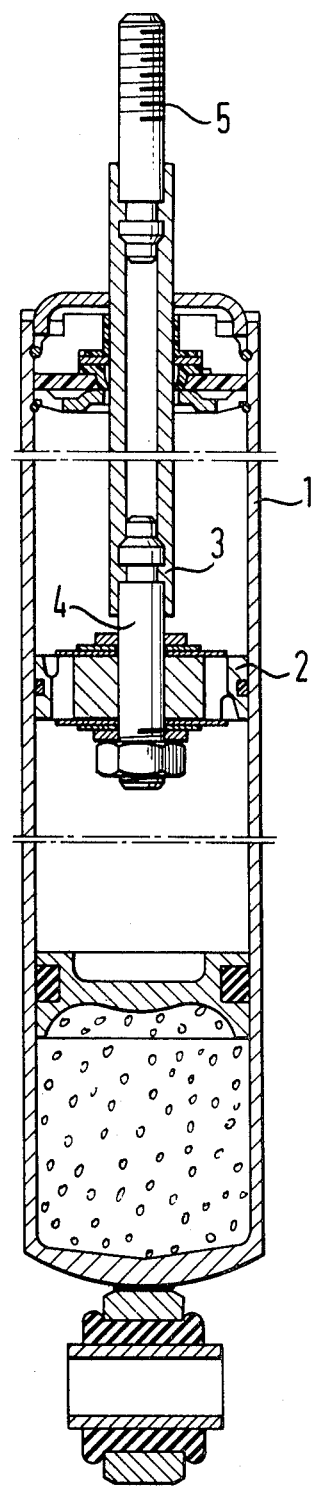
FIG. 1 shows a shock absorber incorporating a piston rod unit manufactured according to this invention.

It is to be noted that the fastening pin 4a is provided with an inner end portion 7 with an inner end face 7a which inner end portion has an outer diameter substantially corresponding to the initial inner diameter di of the tubular piston rod so that the end portion 7 can be used for centering the fastening pin 4a before axially pressing the fastening pin into the tubular piston rod 3. The inner end face 7a has a conically tapered edge 14 to facilitate insertion. It is further to be noted that adjacent the inner end portion 7 of the fastening pin 4a there is provided a tapered or frusto-conically shaped expanding face 8 which is responsible for the expansion of the tubular piston rod during the insertion of the fastening pin 4a into the cavity of the piston rod 3. The frusto-conically shaped expanding face 8 has a first end with a smaller diameter $d_s$ and a second end with a larger diameter $d_1$.

Finally it is to be noted that the fastening pin 4a is provided with an annular groove 6, which defines two shoulder faces 6a and 6b. The annular groove 6 is spaced from the expanding face 8 by an axially extending cylindrical member 9.

Figure 2A:
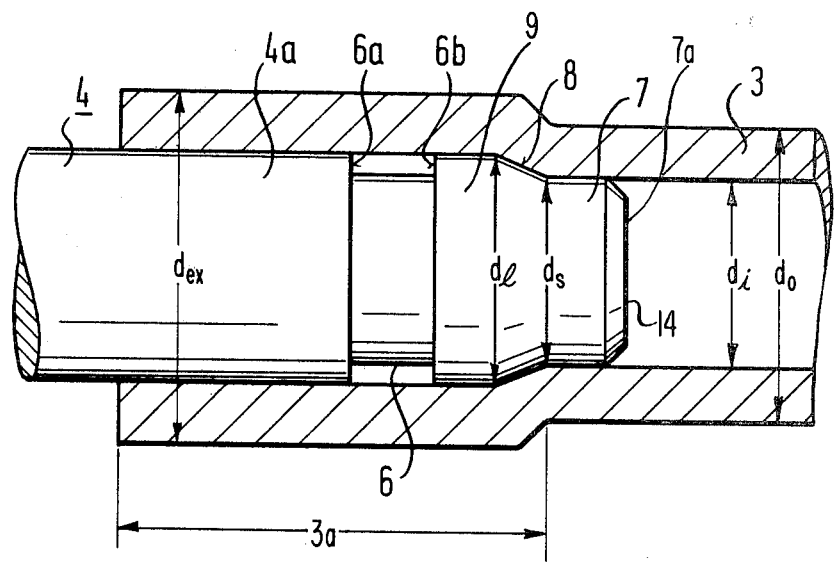
FIGS. 2a and 2b show subsequent phases in performing the method of this invention according to a first mode of this method.
Figure 2B:
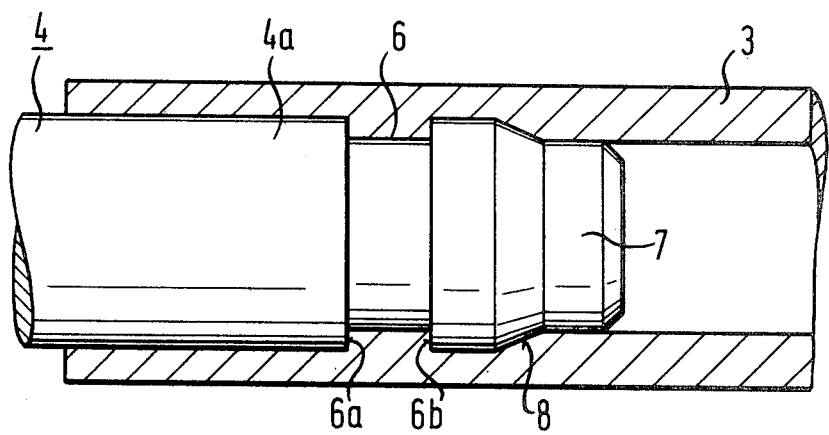

In FIG. 2b there is shown the connection between the tubular piston rod 3 and the fastening pin 4a after the expanded end portion 3a of the piston rod 3 has been radially compressed by hammering along the axial extent of the fastening pin 4a. It is to be noted that after this hammering operation the smooth cylindrical outer circumferential face of the piston rod 3 has been reestablished over the total length of the piston rod 3 and the material of the piston rod 3 has entered into the annular groove 6 and engages the axially directed shoulder faces 6a and 6b so that a connection has been established which allows the transmission of high axial forces in both axial directions.

It is to be noted that the maximum diameter of the fastening pin 4a exceeds the initial inner diameter of the piston rod 3 by 0.7 to 1.5 mm.

Figure 7:
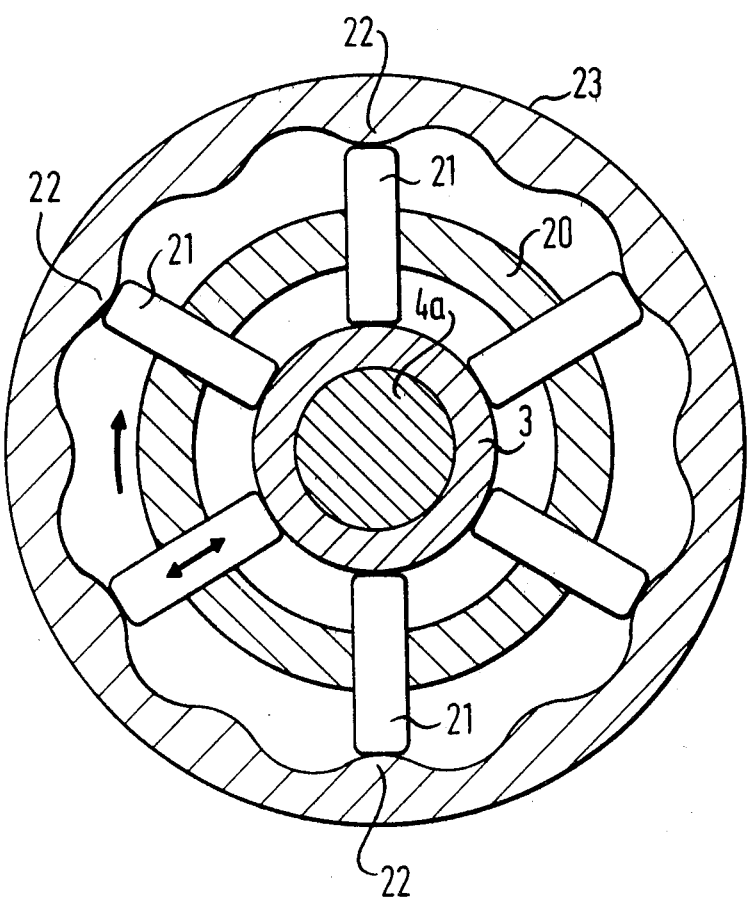

In FIG. 7 there is shown the hammering operation. The piston rod 3 is mounted in a stationary chuck which is not shown. The end portion of the piston rod 3 which accommodates the fastening pin 4a is entered into a rotating hammering unit. This rotating hammering unit comprises a rotating ring member 20 in which a plurality of hammers 21 are guided in radial direction. The radial inner ends of the hammers act on the outer circumferential face of the tubular piston rod 3, whereas the radial outer end of the hammers are in engagement with a cam surface 22 of a stationary annular control member 23.

Figure 3A:
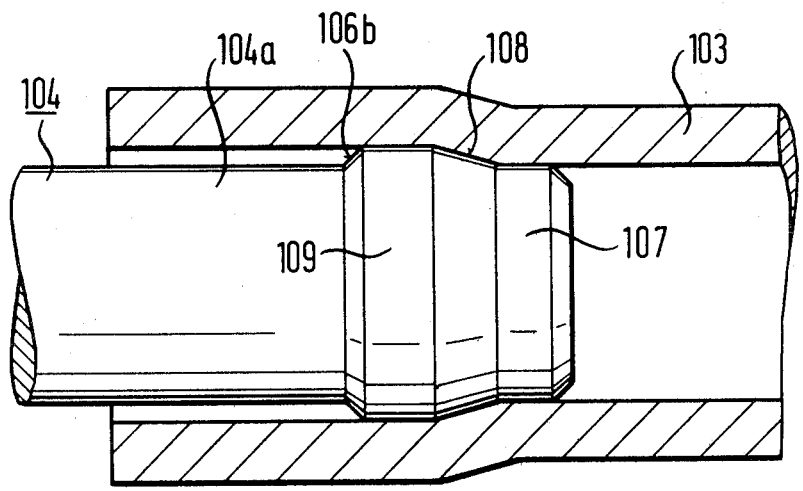
FIGS. 3a and 3b show subsequent phases of the method of this invention according to a second mode of this method.
Figure 3B:
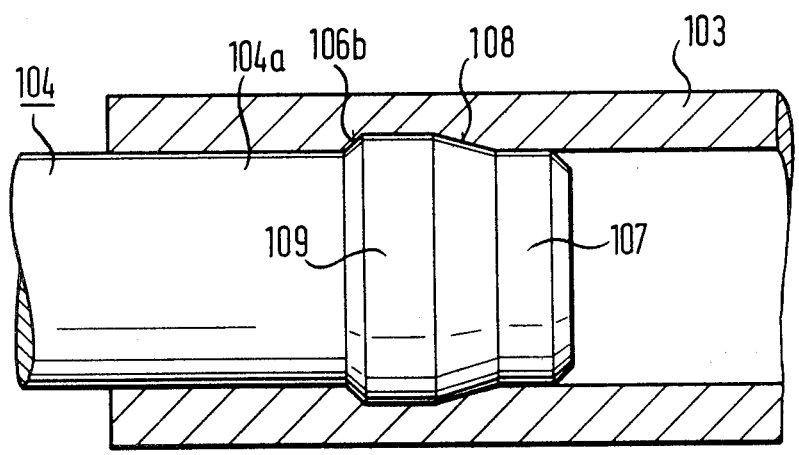

The piston 3 is in this example made by stainless steel so that the piston rod 3 may be exposed to corrosive media and now chrome plating is necessary. Subsequent to the hammering operation the outer circumferential face of the piston rod 3 is a smooth cylindrical face having a substantial constant diameter over its total length. The piston rod 3 is then subjected to a centerless grinding operation. In FIG. 3a and 3b analogous parts are designated by the same reference numerals as in FIG. 2a and 2b increased by 100.

In FIG. 3a one recognizes a head member 109 of the fastening pin 104a, said head member 109 having an outer diameter exceeding the initial inner diameter of the hollow piston rod 103. Shoulder face 106b is defined by the head member 109.

Figure 4A:
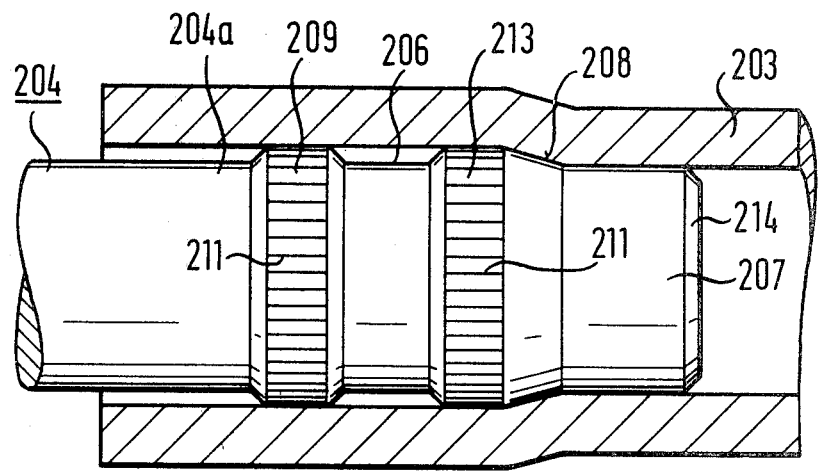
FIGS. 4a and 4b show subsequent phases of the method of this invention according to a third mode thereof.
Figure 4B:
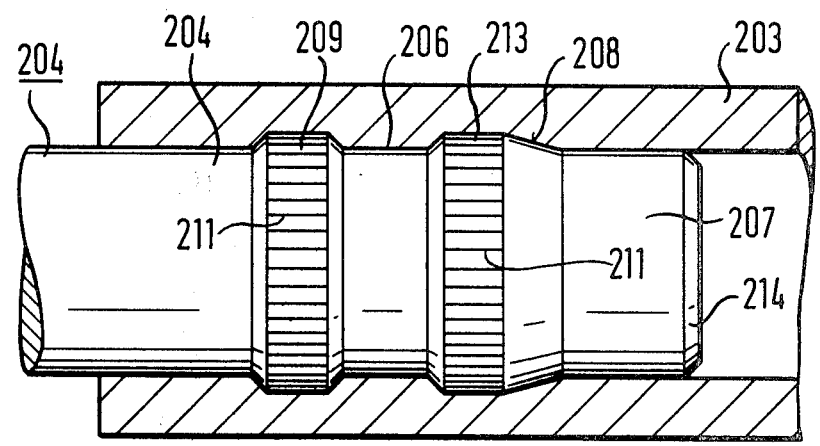

According to the embodiment of FIG. 4a and 4b two head members 209 and 213 have been shaped on the fastening pin 204a by axial compression. The outer circumferential faces of the head members 209 and 213 are knurled at 211.

Due to the knurled surfaces 211 a high torque can be transmitted from the terminal member 204 to the tubular piston rod 203. It is further to be noted that the end portion 207 is provided with a conically tapered edge 214. By the head members 209 and 213 shoulder faces are defined also in this embodiment.

Figure 5A:
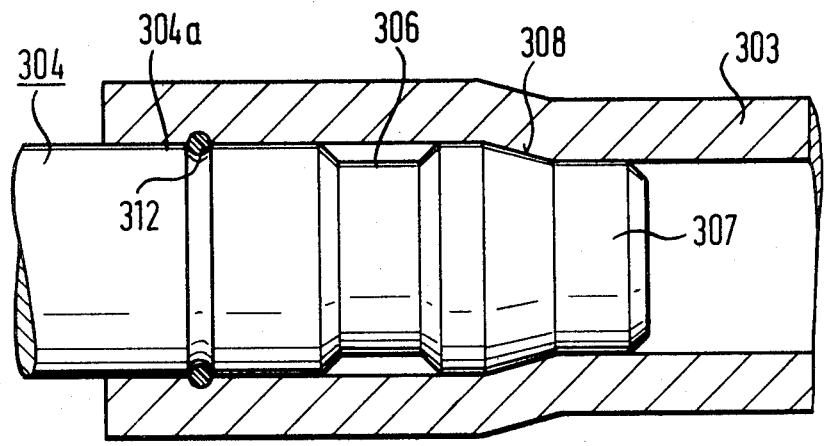
FIGS. 5a and 5b show subsequent phases of the method of this invention according to a fourth mode thereof.
Figure 5B:
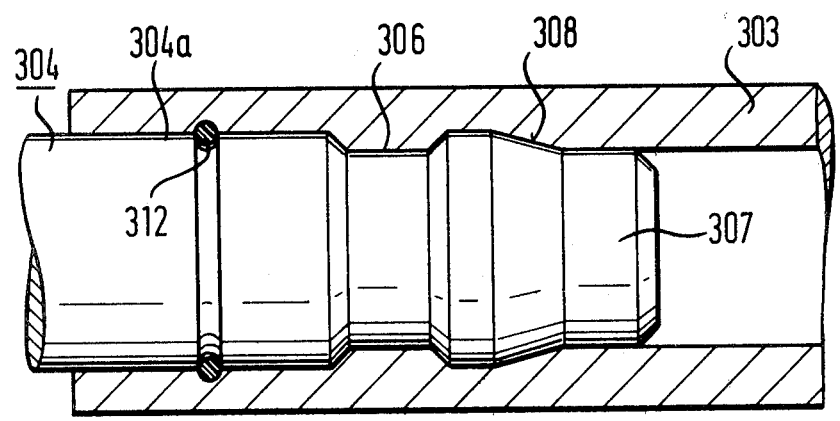

FIG. 5a and 5b show an embodiment in which an annular sealing member 312 is provided between the tubular piston rod member 303 and the fastening pin 304a. An annular groove may be provided in the outer circumferential face of the fastening pin 304a for accommodating this annular sealing member 312.

Figure 6A:
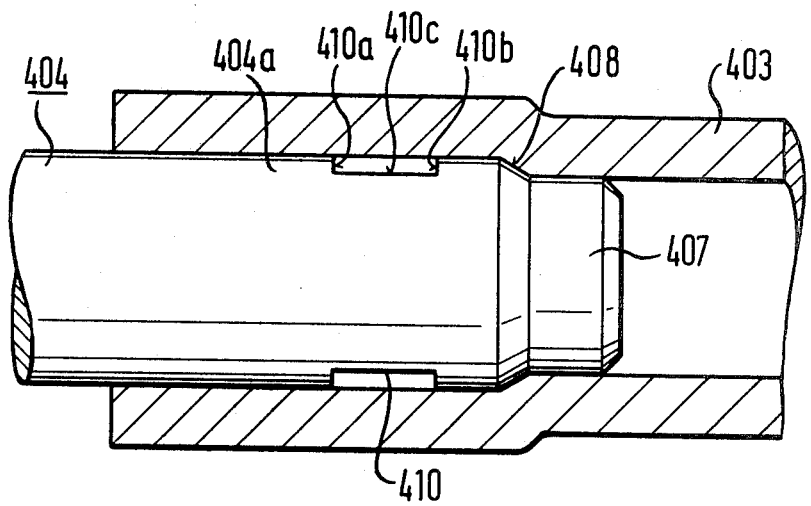
FIGS. 6a and 6b show subsequent phases of the method of this invention according to a fifth mode thereof and FIG. 7 shows the performance of the hammering step.
Figure 6B:
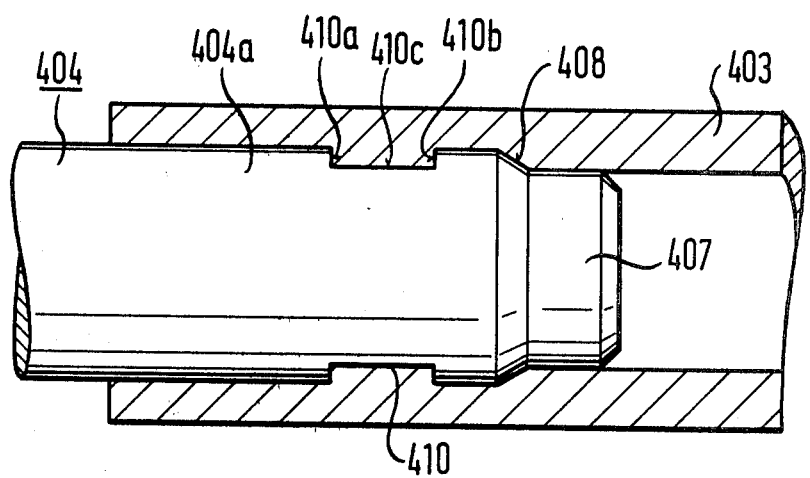

In the enbodiment of FIG. 6a and 6b a groove 410 has been provided in the outer circumferential face of the fastening pin 404a, which groove 410 is defined by axially terminal faces 410a and 410b and a substantially planar bottom face 410c which is parallel to the axis of the piston rod 403.

Also in this embodiment the piston rod 403 is re-shaped as shown in FIG. 6b by the hammering operation to a fully cylindrical face of constant diameter over its total length.

Although the invention has been described as illustrated herein by reference to specific embodiments thereof, it will be understood that many modifications and variations of such embodiments may be made without departing from the inventive concepts disclosed.

For instance the fastening pins may be provided with different profiles. Moreover the fastening pin can be made of a material which is highly ductile so that the material is re-shaped during the compressing operation.

In this case the fastening pin may have a smooth cylindrical outer circumferential face without any profile.

What is claimed is:

1. A method of manufacturing a piston rod unit, including a metallic tube-shaped piston rod member having an initial inner diameter ($d_i$) and an initial outer diameter ($d_o$) and defining a cavity therein, and at least one terminal member (4) having a fastening pin (4a) within a respective end portion of said cavity, said method comprising the following steps:
    (a) providing a steel-made, tube-shaped piston rod member (3) with a constant initial inner diameter ($d_i$) and constant initial outer diameter ($d_o$) over the total axial length thereof;
    (b) providing a steel-made, terminal member (4) with the fastening pin (4a) to be introduced into said cavity, said fastening pin (4a) having
        (b1) an inner, substantially cylindrical end portion (7);
        (b2) an inner end face (7a) at the inner end of said inner end portion (7);
        (b3) an annular axially extending frusto-conically shaped expanding face (8) having a first end with a smaller diameter ($d_s$) adjacent said inner end portion (7) and substantially corresponding to said initial inner diameter ($d_i$) of said tube-shaped piston rod member (3), and a second end with a larger diameter ($d_1$) adjacent the axial end of said expanding face (8) remote from said inner end face (7a), said larger diameter ($d_1$) being larger than said initial inner diameter ($d_i$) of said tube-shaped piston rod member;
        (b4) at least one shoulder face (6b) directed away from said inner end face (7a) and being located on the side of said expanding face (8) which is remote from said inner end face (7a);
    (c) introducing said inner end portion (7) into said cavity;
    (d) urging said fastening pin (4a) into said cavity so as to expand said tube-shaped piston rod member (3) along an axial end portion (3a) thereof by said expanding face (8), the outer diameter of said tube-shaped piston rod member (3) being expanded to an expanded diameter ($d_{ex}$) along said end portion (3a), said expanded diameter ($d_{ex}$) being larger than the initial outer diameter ($d_o$) of said tube-shaped piston rod member and the expanded inner diameter of said piston rod member corresponding to both the larger diameter second end and the annular axially extending frusto-conically shaped expanding face of said expanding face;
    (e) radially compressing said expanded end portion (3a) of said tube-shaped piston rod member (3) by cold shaping so as to reduce said expanded diameter ($d_{ex}$) substantially to said constant initial outer diameter ($d_o$) and to obtain axial engagement of said steel of said tubular piston rod member (3) with said shoulder face (6b).

2. A method as set forth in claim 1, wherein the step of radially inwardly compressing said piston rod member is performed by cold kneading the material on said piston rod member.

3. A method as set forth in claim 1, wherein the step of radially inwardly compressing said piston rod member is performed by cold hammering.

4. A method as set forth in claim 1, including the step of providing said fastening pin with at least one recess extending inwardly from the outer surface thereof and located on the side of the expanding face more remote from the inner end face, and the at least one recess defining the at least one shoulder face in the recess for engagement with the material of the piston rod member at the inner circumferential surface thereof.

5. A method as set forth in claim 4, including arranging said shoulder face to extend substantially perpendicularly of the axial direction of the piston rod member.

6. A method as set forth in claim 4, including forming the recess as an annular recess around the axis of said fastening pin.

7. A method as set forth in claim 4, including forming the recess with a radially inner bottom face extending substantially planar and parallel to the axis of said fastening pin.

8. A method as set forth in claim 4, including forming the shoulder face extending substantially in the circumferential direction with respect to the axis of said fastening pin.

9. A method as set forth in claim 1, including the steps of axially compressing said fastening pin for forming said larger outer diameter thereof.

10. A method as set forth in claim 1, including forming said larger outer diameter of said fastening pin for exceeding said initial inner diameter of said piston rod member by at least 0.5 mm.

11. A method as set forth in claim 9, wherein performing the step of axially compressing said larger outer diameter of said fastening pin for exceeding said initial inner diameter of said piston rod member by at least 1 mm.

12. A method as set forth in claim 1, including the step of forming the inner end portion of said fastening pin with an outer diameter substantially equal to said initial inner diameter of said tubular piston rod member.

13. A method as set forth in claim 1, including conically tapering the inner end portion of said fastening pin inwardly to the inner end face thereof.

14. A method as set forth in claim 1, including shaping said terminal member as a connection member for connecting said piston rod member to a piston member.

15. A method as set forth in claim 1, including shaping said terminal member as a connection member for connecting said piston rod unit to a structural element.

16. A method as set forth in claim 1, including placing sealing means between and in contact with the surface of said fastening pin and the surface defining the cavity in said tubular piston rod member.

17. A method as set forth in claim 1, including forming said tubular piston rod member as a section of a drawn tube as obtained from a drawing installation.

18. A method as set forth in claim 1, including machining said piston rod member subsequent to said radial compressing.

19. A method as set forth in claim 18, including centerless grinding said piston rod member subsequent to said radial compressing.

20. A method as set forth in claim 18, including chrome plating said piston rod member subsequent to said machining step.

21. A method as set forth in cliam 1, including forming the axially extending face with a curved generatrix defining the expanding face by rotating the curved generatrix about the axis of the fastening pin.

22. A method as claimed in claim 1, wherein a substantially cylindrical portion (9) of said fastening pin (4a) is provided between said end of said expanded face (8) having said larger diameter ($d_1$) and said shoulder face ($6_b$), said substantially cylindrical portion (9) having an outer diameter corresponding to said larger diameter ($d_1$).

23. A method as claimed in claim 1, wherein said fastening pin (404a) is provided with at least one torque transmitting face (410c), said steel of said tubular piston rod member (403) being brought into torque transmitting engagement with said torque transmitting face (410c), when said expanded end portion is radially compressed.

24. A method as claimed in claim 1 further comprising, providing said terminal member with a maximum outer diameter being smaller than said initial outer diameter ($d_o$) of said tubular piston rod member.

25. A method as claimed in claim 1, wherein said axial engagement of said steel of said tubular piston rod member (3) with said shoulder face ($6b$) is made such as to transmit considerable axial forces preventing extraction of said fastening pin from said end portion of said cavity.

26. A method as claimed in claim 1, including placing said fastening pin into fluid-tight engagement with said tubular piston rod member by said radial compression.

27. A method as claimed in claim 1, including centerless grinding of said tubular piston rod member (3) including said axial end portion (3a).

28. A method of manufacturing cylinder piston device comprising a cylinder (1) having an axis and two end walls and defining a chamber therein, at least one of said end walls being provided with an aperture and sealing means surrounding said aperture, a tubular piston rod member defining a cavity therein and extending in axial direction through said aperture and said sealing means, a piston unit within said chamber and fixed to the inner end of said tubular piston rod member, a terminal member provided on the outer end of said tubular piston rod member, at least one of said piston unit and said terminal member being fixed to said tubular piston rod member by a fastening pin entering into a respective end portion of said cavity, said method comprising the following steps:

(a) providing a steel-made, tube-shaped piston rod member (3) with a constant initial inner diameter ($d_i$) and constant initial outer diameter ($d_o$) over the total axial length thereof;

(b) providing said fastening pin (4a) to be introduced into said cavity, said fastening pin being made of steel and having (b1) an inner, substantially cylindrical end portion (7);

(b2) an inner end face (7a) at the inner end of said inner end portion (7);

(b3) an annular axially extending frusto-conically shaped expanding face (8) having a first end with a smaller diameter ($d_s$) adjacent said inner end portion (7) and substantially corresponding to said initial inner diameter ($d_i$) of said tube-shaped piston rod member (3), and a second end with a larger diameter ($d_1$) adjacent the axial end of said expanding face (8) remote from said inner end face (7a), said larger diameter ($d_1$) being larger than said initial inner diameter ($d_i$) of said tube-shaped piston rod member;

(b4) at least one substantially axially directed shoulder face ($6b$) directed away from said inner end face (7a) being located on the side of said expanding face (8) which is remote from said inner end face (7a);

(c) introducing said inner end portion (7) into said cavity;

(d) urging said fastening pin (4a) into said cavity so as to expand said tube-shaped piston rod member (3) along an axial end portion (3a) thereof by said expanding face (8), the outer diameter of said tube-shaped piston rod member (3) being expanded to an expanded diameter ($d_{ex}$) along said end portion (3a), said expanded diameter ($d_{ex}$) being larger than the initial outer diameter ($d_o$) of said tube-shaped piston rod member and the expanded inner diameter of said piston rod member corresponding to both the larger diameter second end and the annular axially extending frusto-conically shaped expanding face of said expanding face;

(e) radially compressing said expanded end portion (3a) of said tube-shaped piston rod member (3) by cold shaping so as to reduce said expanded diameter ($d_{ex}$) substantially to said constant initial outer diameter ($d_o$) and to obtain axial engagement of said steel of said tubular piston rod member (3) with said shoulder face (6b); and (f) assembling said cylinder, said tubular piston rod member, said piston unit and said one end wall such that at least part of said end portion (3a) of said tubular piston rod member (3) is free to pass through said aperture and said annular sealing means in operation.

29. A method as claimed in claim 28, including centerless grinding of said tubular piston rod member (3) including said axial end portion (3a).

* * * * *